United States Patent [19]

Noda

[11] 4,345,726

[45] * Aug. 24, 1982

[54] FISHING REEL WITH SPOOL SHAFT BEARINGS

[75] Inventor: Hideo Noda, Sakai, Japan

[73] Assignee: Shimano Industrial Company Limited, Osaka, Japan

[*] Notice: The portion of the term of this patent subsequent to Sep. 16, 1997, has been disclaimed.

[21] Appl. No.: 117,988

[22] Filed: Feb. 4, 1980

[30] Foreign Application Priority Data

Feb. 15, 1979 [JP] Japan .............................. 54-18628[U]

[51] Int. Cl.³ .......................................... A01K 89/00
[52] U.S. Cl. ..................................... 242/212; 242/217
[58] Field of Search .................. 242/84.1 R, 212, 213, 242/214, 217, 218

[56] References Cited

U.S. PATENT DOCUMENTS

| | | | |
|---|---|---|---|
| 3,315,913 | 4/1967 | Grieten | 242/214 |
| 4,003,270 | 1/1977 | Moosberg | 242/84.1 R |
| 4,014,422 | 3/1977 | Morishita | 242/212 |
| 4,130,251 | 12/1978 | Findley | 242/84.1 R |
| 4,222,537 | 9/1980 | Noda | 242/212 |

*Primary Examiner*—Billy S. Taylor
*Attorney, Agent, or Firm*—Stevens, Davis, Miller & Mosher

[57] ABSTRACT

A fishing reel has a spool shaft journaled between a pair of side frames through a first and a second bearing. The second bearing is supported to a cylindrical bearing case and the spool shaft carries a pinion axially rotatably. The pinion enters at one axial end portion into the bearing case and carries a third bearing at the axial end portion, so that when the spool shaft tends to deflect, the third bearing contacts with the bearing case to thereby prevent the deflection of spool shaft.

3 Claims, 2 Drawing Figures

FISHING REEL WITH SPOOL SHAFT BEARINGS

BACKGROUND AND SUMMARY OF THE INVENTION

This invention relates to a fishing reel, and more particularly to a fishing reel which is so constructed that a spool shaft having a spool is journaled between a pair of side frames opposite to each other at a given interval and a handle shaft is rotated to wind up a fishing line onto the spool.

Generally, this kind of reel has a pinion axially movably supported to the spool shaft, the pinion engaging with a driving gear fixed to the handle shaft, so that rotation of the handle shaft is transmitted to the spool to thereby wind up the line.

When a handle bar of the reel is operated to rotate the spool shaft to wind up the line onto the spool, the line, if subjected to a sufficiently great load, causes a deflection in the spool shaft, and flanges of the spool contact at the outer peripheries with the side frames respectively, whereby the spool is subjected to greater resistance against rotation of the spool. On the other hand, the spool shaft is supported at both axial ends thereof by bearings mounted to the side frames respectively, anda the bearing at the pinion side is mounted to a bearing case caulked to one side frame. When the spool shaft deflects, the bearing case is subjected to a scraping force. As a result, the caulked portion of the bearing case fractures.

This invention has been designed to overcome the aforesaid problems. An object of the invention is to provide a fishing reel capable of reducing deflection of the spool shaft preventing the spool from contacting the side frames, whereby rotational resistance applied to the spool can be reduced. The scraping force acting on the bearing case can be eliminated, and the caulked portion of the case to the side frame can be prevented from fracturing.

The fishing reel of the invention is so constructed that a spool shaft is journaled between a pair of side frames through a first and a second bearing. The second bearing bears the spool shaft at its one axial end side and is supported by a cylindrical bearing case. A pinion, which has two first and second end portions, enters at the second end portion into the bearing case, and a third bearing is fixed to the entering end portion. The third bearing, when the spool shaft tends to deflect, contacts with the bearing case so that the bearing case bears the spool shaft to thereby restrain deflection of the spool shaft.

In other words, the bearing case is fixed to the one side frame, and the second bearing is mounted to the outside of the frame so as to support the spool shaft at its one axial end. A pinion is axially movably supported onto the spool shaft and the third bearing is fixed to the pinion, so that, if deflection occurs at the spool shaft, the third bearing bears the spool shaft to minimize the deflection. The third bearing is formed mainly of a collar of a ring-like shape and has a round outer periphery opposite to the inner periphery of the bearing case. The outer diameter of the third bearing is slightly smaller than a diameter of the inner periphery of the bearing case.

These and other objects and novel features of the invention will be more apparent upon a reading of the following detailed specification and drawings.

DETAILED DESCRIPTION OF THE INVENTION

Figure 1:
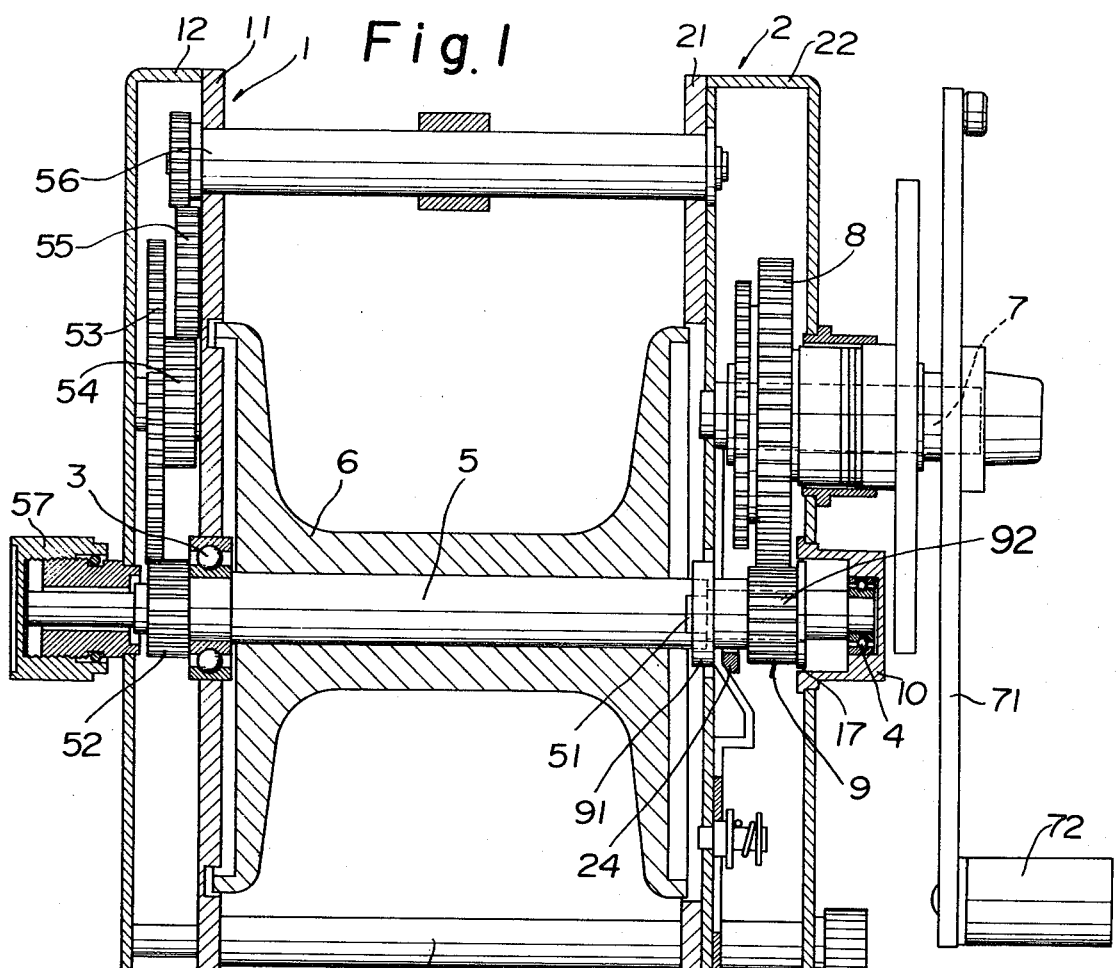
FIG. 1 is a cross-sectional plan view of an embodiment of a fishing reel of the invention.

A fishing reel of the invention basically comprises a pair of first and second side frames 1 and 2, a spool shaft 5 journaled between the side frames through two first and second bearings 3 and 4, a spool 6 fixed to the spool shaft 5, a handle shaft 7, and a driving gear 8 and pinion 9 for transmitting rotation of the handle shaft 7 to the spool shaft 5.

The side frames 1 and 2 comprise side plates 11 and 21 and covers 12 and 22 mounted at the outsides of side plates 11 and 21 respectively, and are connected at a given interval through a plurality of connecting rods 13. The first bearing 3 is mounted to the side plate 11 at the first side frame 1, a cylindrical bearing case 10 is caulked to the cover 22 at the second side frame 2, and the second bearing 4 is insertably fixed to the bearing case 10. In addition, the bearing case 10 has an inner diameter larger than the outer diameter of pinion 9.

The pinion 9 is supported axially movably to the spool shaft 5 at the one axial end side thereof, i.e., at the second bearing side, and has two first and second axial end portions. The first axial end portion of the pinion 9 at the spool 6 side is provided with an engaging portion 91 having a groove engageable with engaging faces 51 formed at the spool shaft 5. At the second axial end portion of the pinion 9 at the second bearing 4 side are provided teeth 92 in mesh with the driving gear 8, the second end portion always entering the bearing case 10. The third bearing 20 is fixed to the entering end portion of the pinion 9.

The third bearing 20 is formed mainly of a ring-like shaped collar and has a round outer periphery opposite to the inner periphery of bearing case 10, the round outer periphery being slightly smaller in diameter than the inner periphery of bearing case 10. When the spool shaft 5 deflects, the third bearing 20 contacts at its outer periphery with the inner periphery of bearing case 10 to thereby prevent further deflection of the spool shaft 5.

Figure 2:
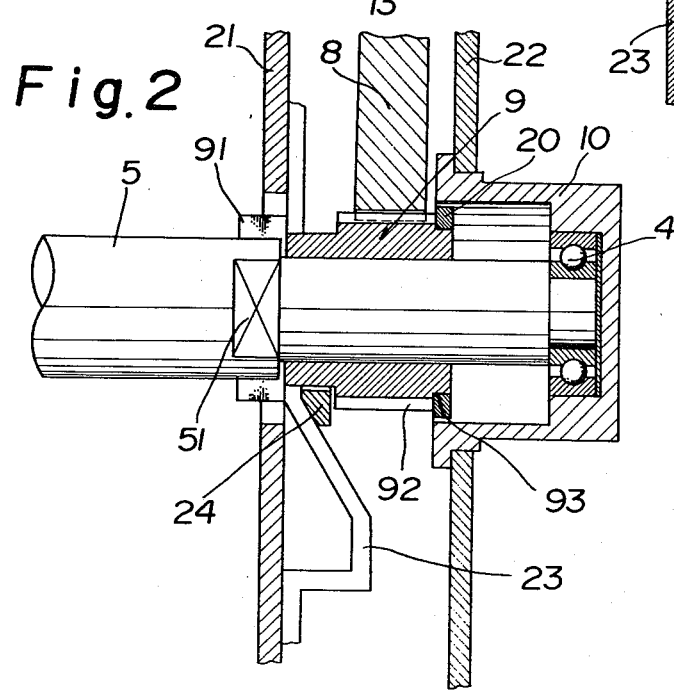
FIG. 2 is an enlarged cross-sectional view of the principal portion of the reel.

The third bearing 20 is fixed to the pinion 9 in such a manner that an annular mounting portion 93 smaller in diameter than the second axial end portion of pinion 9 is formed at the second axial end portion as shown in FIG. 2, so that the third bearing is fixed to the mounting portion by means of press-fit or shrinkage fit. In addition, the outer diameter of third bearing 20 may be equal to that of the pinion 9, but is preferably slightly larger.

The pinion gear 9 is moved by operating a clutch lever 23 supported to the side plate 21 at the second side frame 2, in reciprocation between a first position where the engaging portion 91 engages with the engaging faces 51 as shown in FIG. 1 and a second position where the engaging portion 91 disengages from the engaging faces 51.

When the pinion 9 is in the first position, rotation of the driving gear 8 is transmitted to the spool shaft 5 through the pinion 9 to thereby rotate the spool 6. The pinion 9, when in the second position, is disconnected from the spool shaft 5 so that the spool 6 together with the spool shaft rotates freely.

The clutch lever 23, as shown in FIG. 1, has a slant face, which face is operated by the lever 23 to move a holder 24 for the pinion 9 axially of the spool shaft 5, thereby moving the pinion 9 from the first position in FIG. 1 to the second position. The pinion 9 at the second position is returned by rotating the handle shaft 7. The aforesaid construction is well-known and will be understood without detailed description. Also, it will be understood that the second end portion of pinion 9 always enters the bearing case 10, even when the pinion 9 is in the first position as shown in FIG. 1, the second end portion is kept within the bearing case 10.

Referring to FIG. 1, reference numeral 71 designates a handle bar fixed to an axial end of the handle shaft 7, 72 a grip, and 52 a pinion fixed to the spool shaft. 53, 54 and 55 designate reduction gears in association with the pinion 52. 56 designates a driving shaft for a guide (not shown) guiding a fishing line to the spool 6 in association with the reduction gear 55 and 57 designates a drag mechanism for applying rotational resistance to the spool shaft 5.

The fishing reel of the invention is constructed according to the foregoing, in which the handle bar 71 is revolved to rotate the spool 6 together with the spool shaft 5 through the driving gear 8 and, pinion 9 engagement of the groove at the engaging portion 91 of pinion 9 with the engaging faces 51 at the spool shaft 5, thereby winds the fishing line onto the spool 6. In this instance, the line, when subjected to a greater load, tends to cause a deflection in the spool shaft 5. At this time, the third bearing 20 contacts at its outer periphery with the inner periphery of bearing case 10 to thereby prevent the deflection of spool shaft 5. Hence, the outer periphery of each flange of the spool 6 does not contact with the respective side plates 1 and 2, and the caulked portion of bearing case 10 to the cover 22 is not subjected to scraping force. In other words, when the spool shaft 5 deflects, the caulked portion of bearing case 10 is subjected to a moment, the so-called scraping force, based on the existence of an interval between the caulked portion and the bearing 4. However, the moment (scraping force) is not applied to the caulked portion of bearing case 10 due to the fact that the outer periphery of a third bearing 20 contacts with the inner periphery of bearing case 10 so that the cover 22 withstands through the third bearing 20 and bearing case 10 the force causing a deflection in the spool shaft 5.

As clearly understood from the aforesaid description, the fishing reel of the invention avoids the spool shaft deflection allowing each flange of the spool to contact at its outer periphery with each side frame when the fishing line is wound onto the spool. In other words, although the spool shaft tends to deflect when the line being wound onto the spool is subjected to a greater load, the third bearing contacting at its round outer periphery with the inner periphery of the bearing case prevents the deflection in the spool shaft. Hence, the outer peripheries of the flanges do not contact with the side frames reducing rotational resistance applied to the spool.

Furthermore, since the side frame bears the deflection of the spool shaft directly through the bearing case, the fixed portion of the bearing case to the side frame is not subjected to scraping force and there is no danger of fracturing the fixed portion of the bearing case.

While the form of embodiment of the invention as herein disclosed constitutes a preferred form, it is understood that other forms might be adopted, within the scope of the claims which follow.

What is claimed is:
1. A fishing reel comprising,
a pair of first and second side frames, said side frames being opposite to each other at a given interval,
a first bearing supported to said first side frame,
a cylindrical bearing case fixed to said second side frame,
a second bearing supported to said bearing case,
a spool shaft rotatably supported by said first and second bearings, said spool shaft having engaging faces,
a spool mounted to said spool shaft rotatably together therewith,
a handle shaft supported to said second side frame,
a driving gear fixed to said handle shaft,
a pinion in mesh with said driving gear, said pinion having a first and a second end portion and being supported axially movably on said spool shaft, said first end portion at the spool side being provided with an engaging portion in mesh with said engaging faces of said spool shaft, said second end portion at the second bearing side always extending into said bearing case,
a third bearing fixed to the second end portion of said pinion, said third bearing having a round outer periphery adjacent to the inner periphery of said bearing case, said round outer periphery being slightly smaller in diameter than the inner periphery of said bearing case, so that when said spool shaft deflects said third bearing contacts at said outer periphery with the inner periphery of said bearing case to thereby prevent further deflections of said spool shaft.
2. A fishing reel according to claim 1, wherein said third bearing comprises a collar of a ring-like shape and is fixed to the second end portion of said pinion.
3. A fishing reel according to claims 1 or 2, wherein at the second end portion of said pinion is formed an annular mounting portion of a diameter smaller than an outer diameter of said pinion, and said third bearing comprises a collar of a ring-like shape and is fixed to said mounting portion.

* * * * *